US012633077B1

(12) United States Patent
Good

(10) Patent No.: US 12,633,077 B1
(45) Date of Patent: May 19, 2026

(54) SYSTEMS AND METHODS FOR DYNAMIC DIFFERENTIATED CAPTURE OF THREE-DIMENSIONAL ASSETS FOR NON-UNIFORM SPLAT GENERATION

(71) Applicant: Illuscio, Inc., Culver City, CA (US)

(72) Inventor: Max Good, Los Angeles, CA (US)

(73) Assignee: Miris, Inc., Culver City, CA (US)

( * ) Notice: Subject to any disclaimer, the term of this patent is extended or adjusted under 35 U.S.C. 154(b) by 0 days.

(21) Appl. No.: 19/287,142

(22) Filed: Jul. 31, 2025

(51) Int. Cl.
*G06T 19/20* (2011.01)

(52) U.S. Cl.
CPC ...... *G06T 19/20* (2013.01); *G06T 2219/2004* (2013.01)

(58) Field of Classification Search
CPC ... G06T 19/20; G06T 2219/2004; G06T 7/40; G06T 15/08; G06T 15/20; G06T 2210/36
See application file for complete search history.

(56) References Cited

U.S. PATENT DOCUMENTS

| | | | |
|---|---|---|---|
| 12,406,430 B1* | 9/2025 | Lesser | G06T 7/40 |
| 2022/0189130 A1* | 6/2022 | Long | A61C 7/002 |
| 2023/0281913 A1* | 9/2023 | Rematas | G06T 7/55 |
| | | | 345/419 |
| 2025/0209740 A1* | 6/2025 | Revaud | G06T 17/00 |
| 2025/0275833 A1* | 9/2025 | Seeber | G16H 50/20 |

* cited by examiner

*Primary Examiner* — Abderrahim Merouan
(74) *Attorney, Agent, or Firm* — Ansari Katiraei LLP; Arman Katiraei; Sadiq Ansari

(57) ABSTRACT
A system and associated methods perform a dynamic differentiated capture of a three-dimensional (3D) asset for non-uniform splat generation. The system partitions the 3D space of the 3D asset into multiple cells. The system selects a set of cells that encompass a volume of the 3D space in which one or more of the 3D asset primitives are defined. The system determines an amount of visual detail associated with the primitives in each selected cell, and positions virtual cameras in the 3D space to capture a first set of primitives that are associated with a first amount of visual detail from more perspectives than a second set of primitives that are associated with a second amount of visual detail that is less than the first amount of visual detail. The system generates images that non-uniformly capture the 3D asset from the positions of the virtual cameras.

20 Claims, 9 Drawing Sheets

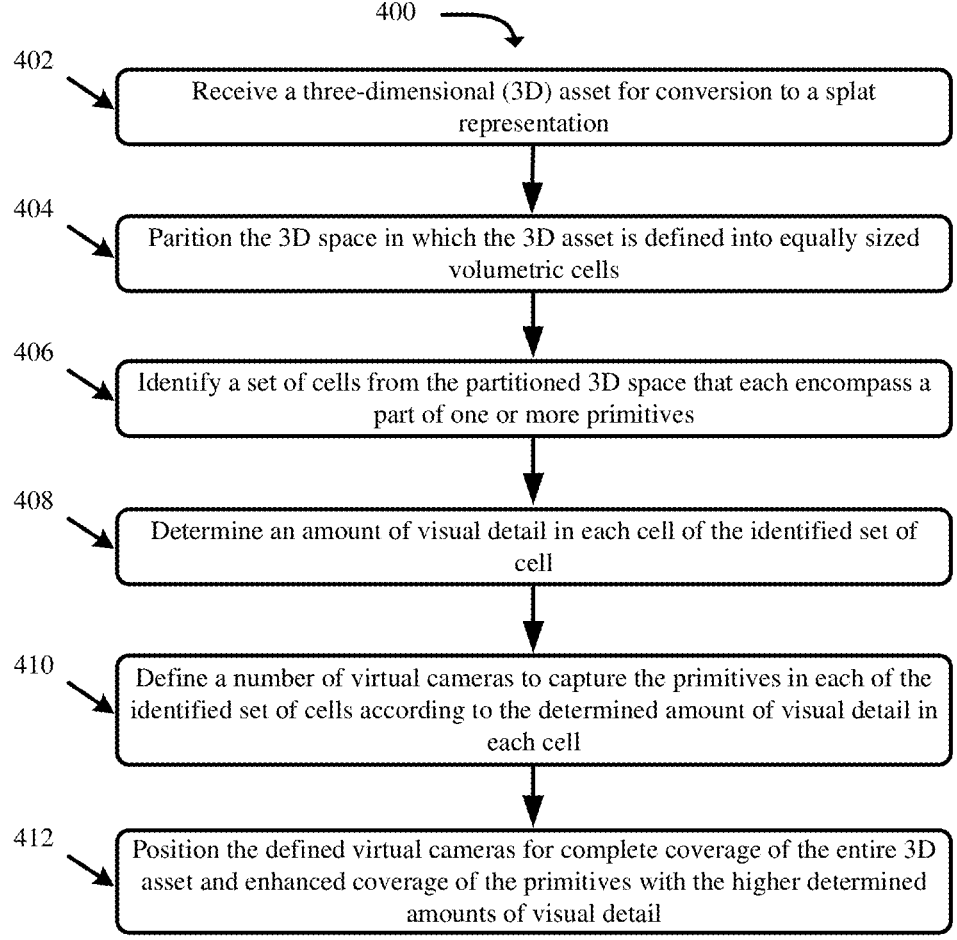

400

402
Receive a three-dimensional (3D) asset for conversion to a splat representation 404
Parition the 3D space in which the 3D asset is defined into equally sized volumetric cells 406
Identify a set of cells from the partitioned 3D space that each encompass a part of one or more primitives 408
Determine an amount of visual detail in each cell of the identified set of cell 410
Define a number of virtual cameras to capture the primitives in each of the identified set of cells according to the determined amount of visual detail in each cell 412
Position the defined virtual cameras for complete coverage of the entire 3D asset and enhanced coverage of the primitives with the higher determined amounts of visual detail

FIG. 4

Amount of visual detail = 1

Amount of visual detail = 3

Amount of visual detail = 7

SYSTEMS AND METHODS FOR DYNAMIC DIFFERENTIATED CAPTURE OF THREE-DIMENSIONAL ASSETS FOR NON-UNIFORM SPLAT GENERATION

BACKGROUND

Gaussian splatting includes obtaining a set of images that capture a three-dimensional (3D) asset from different viewpoints, determining the relative positions of the cameras used to capture the set of images, and iteratively generating and refining different sets of splats until a particular set of splats matches with an acceptable amount of loss the visual detail in the different viewpoints of the 3D asset captured by the set of images. If the cameras do not capture a particular region of the 3D asset or capture the detail within the particular region, then the splat representation generated from the images will omit or lack the detail for the particular region. Accordingly, it is imperative to place the cameras to fully capture the 3D asset and/or adjust coverage for regions with disproportionate amounts of visual detail.

Generating a splat representation from a digital 3D asset encoded in another format (e.g., a mesh, polygonal, or point cloud format) typically includes using a fixed camera rig with equidistant virtual cameras to uniformly image the 3D asset. FIG. 1 illustrates a prior art example of a fixed camera rig with equidistant virtual cameras used to capture a 3D asset for conversion to a splat representation.

In some cases, the fixed camera rig and equidistant placement of virtual cameras may fail to capture certain surfaces or regions of the 3D asset or may capture those surfaces or regions with significant loss of detail as the primitives forming those surfaces or regions may be hidden or obscured from the virtual cameras or may be significantly offset from the virtual camera line-of-sight. Moreover, the fixed camera rig, at best, provides an equal capture of the 3D asset such that regions of very high detail and variation are captured at the same resolution as regions of very low detail and variation. A splat representation that is generated from the captured images will reconstruct the different regions with the uniform amount of detail and variation captured in the images, thereby losing the differentiating detail and variation from the original 3D asset that made certain regions more defined and/or detailed than others. For instance, the splats that represent the boots of the 3D character may be generated with the same detail as the splats representing the 3D character face due to the equal amount of coverage and detail for the boots and face in the captured images.

BRIEF DESCRIPTION OF THE DRAWINGS

FIG. 4 presents a process for automatically positioning virtual cameras to selectively capture a 3D asset for complete and enhanced coverage of the 3D asset in accordance with some embodiments presented herein.

DETAILED DESCRIPTION OF PREFERRED EMBODIMENTS

Figure 1:
FIG. 1 illustrates a prior art example of a fixed camera rig with equidistant virtual cameras used to capture a three-dimensional (3D) asset for conversion to a splat representation.

The following detailed description refers to the accompanying drawings. The same reference numbers in different drawings may identify the same or similar elements.

Provided are systems and associated methods for dynamic differentiated capture of three-dimensional (3D) assets for non-uniform splat generation. A splat generation system dynamically defines positions for virtual cameras around different 3D assets according to the distinct shape of each 3D asset and differing amounts of visual detail at different regions of each 3D asset. The dynamic virtual camera positioning ensures complete coverage of the 3D asset and enhanced coverage of the 3D asset regions with greater visual detail, wherein the enhanced coverage may include capturing the region with greater virtual detail from multiple perspectives and/or from closer up. The splat generation system performs a splatting technique that references the generated images to generate a non-uniform splat representation that preserves the differing amounts of visual detail from the 3D asset in a format that is better optimized for streaming over a data network than the primitives from the original encoding or format of the 3D asset.

The splat generation system dynamically defines the virtual camera positions by partitioning the 3D space in which the 3D asset is defined into voxels or another grid-like structure. The splat generation system identifies the voxels or cells within the grid-like structure containing one or more primitives of the 3D asset. The splat generation system determines the amount of visual detail in each identified voxel or cell with the one or more 3D asset primitives. The splat generation determines the amount of visual detail based on the number of primitives within the voxel or cell, the amount of variation between the primitives in the voxel or cell (e.g., positional or color variation, shape complexity, etc.), the textures that are applied to the primitives in the voxel or cell, and/or the materials associated with the textures or the primitives in the voxel or cell. The splat generation system defines a number of virtual cameras to image the primitives in an identified voxel or cell based on the amount of visual detail determined for that identified voxel or cell. In particular, the splat generation system defines more virtual cameras to capture the primitives of a voxel or cell from more perspectives in response to determining a greater amount of visual detail in that voxel or cell, and defines fewer virtual cameras to capture the primitives of a voxel or cell from less perspectives in response to determining a lesser amount of visual detail in that voxel or cell.

In some embodiments, the splat generation system places the virtual cameras at a fixed distance from the primitives such that all primitives are captured with the same detail and the primitives associated with the greater visual detail are captured with the same detail from additional views or perspectives. In some other embodiments, the splat generation system places the virtual cameras at different distances from the primitives based on the amount of visual detail associated with the primitives. In some such embodiments, the virtual cameras may be placed closer to primitives with greater visual detail and farther from primitives with lesser visual detail. As a result, more pixels are used to capture the primitives with the greater visual detail and less pixels are used to capture the primitives with the lesser visual detail. In some embodiments, the splat generation system defines different camera rigs around different parts of the 3D asset and places the virtual cameras about the different camera rig surfaces with the shape of each different camera rig matching by a threshold amount to the shape of the 3D asset part being imaged.

Figure 2:
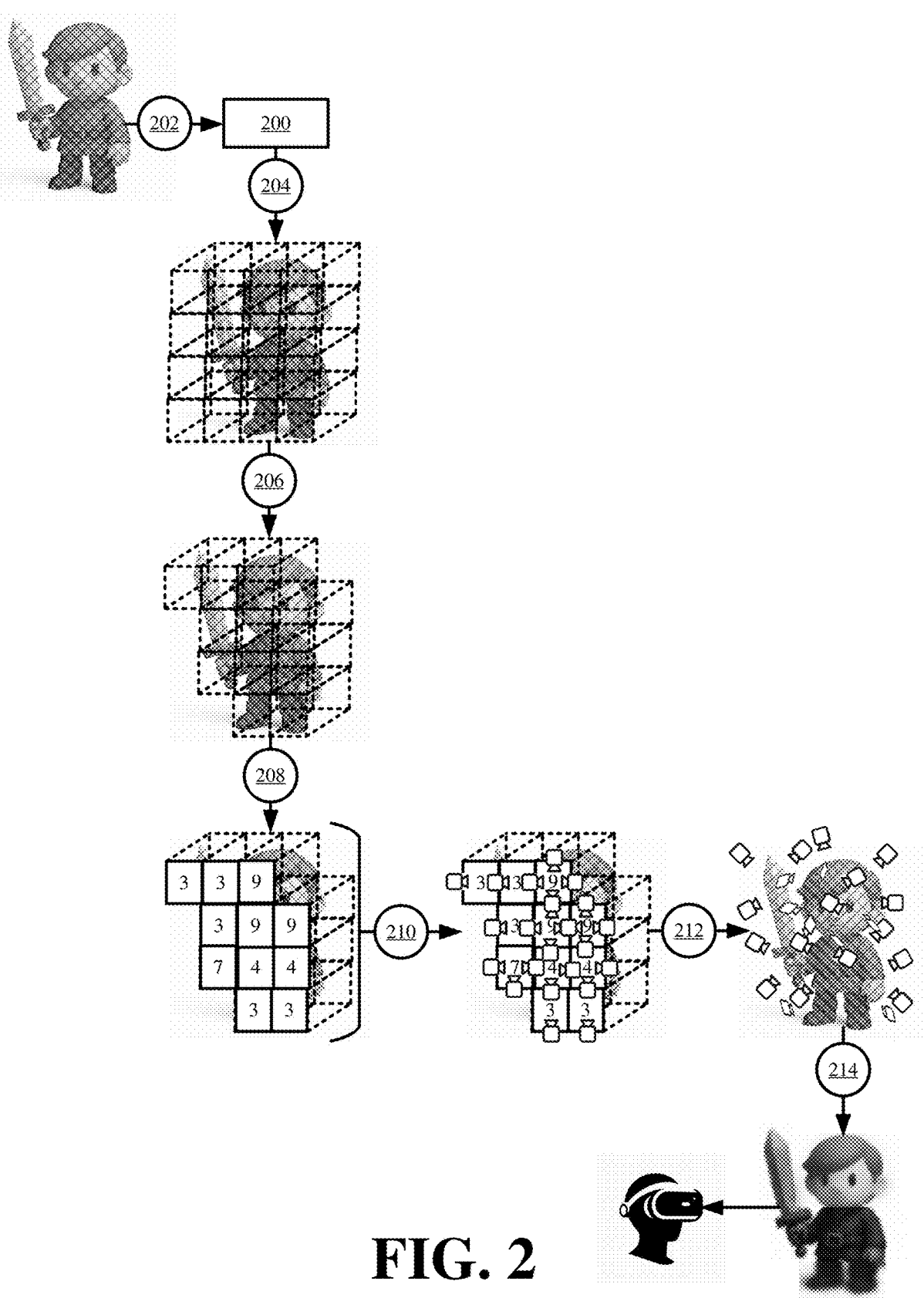
FIG. 2 illustrates an example of the dynamic differentiated capture of a 3D asset in accordance with some embodiments presented herein.

FIG. 2 illustrates an example of the dynamic differentiated capture of a 3D asset in accordance with some embodiments presented herein. Splat generation system 200 receives (at 202) the 3D asset for conversion from a first format to an optimized Gaussian splat or other splat format. For instance, the 3D asset may be defined as a mesh model with a connected set of meshes or polygons (i.e., primitives) that construct the 3D shape and visual characteristics of one or more objects or environments represented by the 3D asset. Alternatively, the 3D asset may be defined as a point cloud with a distributed and disconnected set of points (i.e., primitives) that construct the 3D shape and visual characteristics of the one or more objects or environments represented by the 3D model. In some embodiments, the 3D asset may be defined as implicit surfaces or with other primitives that form or define 3D shapes. In some other embodiments, the 3D asset may be defined as a high resolution splat representation that is to be generated at a lower resolution for streaming over a data network.

Splat generation system 200 defines (at 204) a grid-like structure around the 3D asset. Defining (at 204) the grid-like structure may include partitioning the 3D space of the 3D asset into uniformly sized volumetric cells. For instance, splat generation system 200 may voxelize the 3D space in which the 3D asset is defined with each volumetric cell corresponding to a different voxel.

Splat generation system 200 selects (at 206) the cells that encompass or contain one or more of the 3D asset primitives in their respective partitioned volume of the 3D space. In some embodiments, splat generation system 200 selects (at 206) the cells by determining the volume of 3D space spanned by each cell and by determining the positional parameters of the primitives that are within that volume of 3D space. In other words, splat generation system 200 selects (at 206) the cells programmatically based on the positional data associated with the 3D asset primitives. In some other embodiments, splat generation system 200 selects (at 206) the cells by rendering the 3D asset and the grid-like structure around the 3D asset and by visually identifying the cells containing a rendered visual artifact of the 3D asset.

Splat generation system 200 determines (at 208) the amount of visual detail in each selected (at 206) cell. In some embodiments, the amount of visual detail is determined (at 208) based on the number of distinct primitives in each selected (at 206) cell, the positional variation between the distinct primitives, and/or the visual variation between the distinct primitives. The positional variation corresponds to the shape complexity or differences in the positioning between the primitives in the same cell. For instance, primitives that lie on the same plane and form a flat surface have little or no positional variation, whereas primitives that form a hard edge and/or have more than a 45 degree offset between them have large positional variation. The visual variation is based on differences between the color, brightness, reflectivity, opacity, an/or other visual characteristics of the primitives in the same cell. In some embodiments, the amount of visual detail is determined (at 208) based on the number of textures and/or the complexity of the textures that are applied to the primitives in the cell. Textures increase the positional and/or visual variation across the surface of a primitive and therefore present greater visual detail that requires a higher resolution or multi-view capture.

Splat generation system 200 determines (at 210) a number of different perspectives with which to image the primitives in each selected (at 206) cell based on the determined (at 208) amount of visual detail associated with each selected (at 206) cell. For instance, a single virtual camera may be defined to capture the one or more primitives in a cell from a single perspective when the one or more primitives form a single flat unvaried surface with no visual differentiation across it. Multiple virtual cameras may be defined to capture the one or more primitives in a cell from multiple perspectives or angles when the one or more primitives form a varied or complex surface with positional and/or visual variation due to differences in the primitive definitions and/or textures that are applied to the primitives. In some embodiments, determining (at 210) the number of different perspectives includes determining the number of virtual cameras that is needed to capture the primitives from the number of different perspectives.

Splat generation system 200 positions (at 212) virtual cameras around the 3D asset to capture all regions or primitives of the 3D asset and enhance the capture or coverage for regions or primitives with greater visual detail according to the determined (at 210) number of different perspectives for the different 3D asset primitives. In some embodiments, splat generation system 200 positions the virtual cameras an equal distance from the primitives so that the primitives are captured at the same resolution and/or the same visual amount. The virtual cameras may be positioned away or off the cells and the distance may determine the number of primitives that fall in the virtual camera field-of-view with a closer positioning capturing fewer primitives with greater detail or at a higher resolution and with a more distant positioning capturing more primitives with less detail or at a lower resolution. In some other embodiments, splat generation system 200 positions the virtual cameras with different distances from the primitives. For instance, splat generation system 200 may place the virtual cameras closer to the primitives that have greater visual detail so that more pixels are used to image the visual detail and may place the virtual cameras farther from the primitives with less visual detail so that less detail and a greater number of primitives are captured in each image.

Splat generation system 200 may input the images that are generated by the virtual cameras into a splatting technique. The splatting technique iteratively generates different sets of splats to reconstruct the visual detail of the 3D asset primitives captured by the images from the different perspectives, compares the different sets of splats to the images and/or using a loss function, and outputs (at 214) a splat representation of the 3D representation based on the set of splats that reproduce the visual detail in the images with the least amount of loss or with a threshold amount of loss. Since the dynamically positioned (at 212) virtual cameras capture different parts of the 3D asset with different resolution and/or detail, the resulting splat representation reconstructs the 3D asset with the non-uniform amount of detail. Splat generation system 200 may stream the splat representation in place of the original 3D asset to a requesting user device over a data network with the splat representation presenting the regions that have the greater visual detail with more smaller-sized splats and presenting the regions with lesser detail with fewer larger-sized splats.

Figure 3:
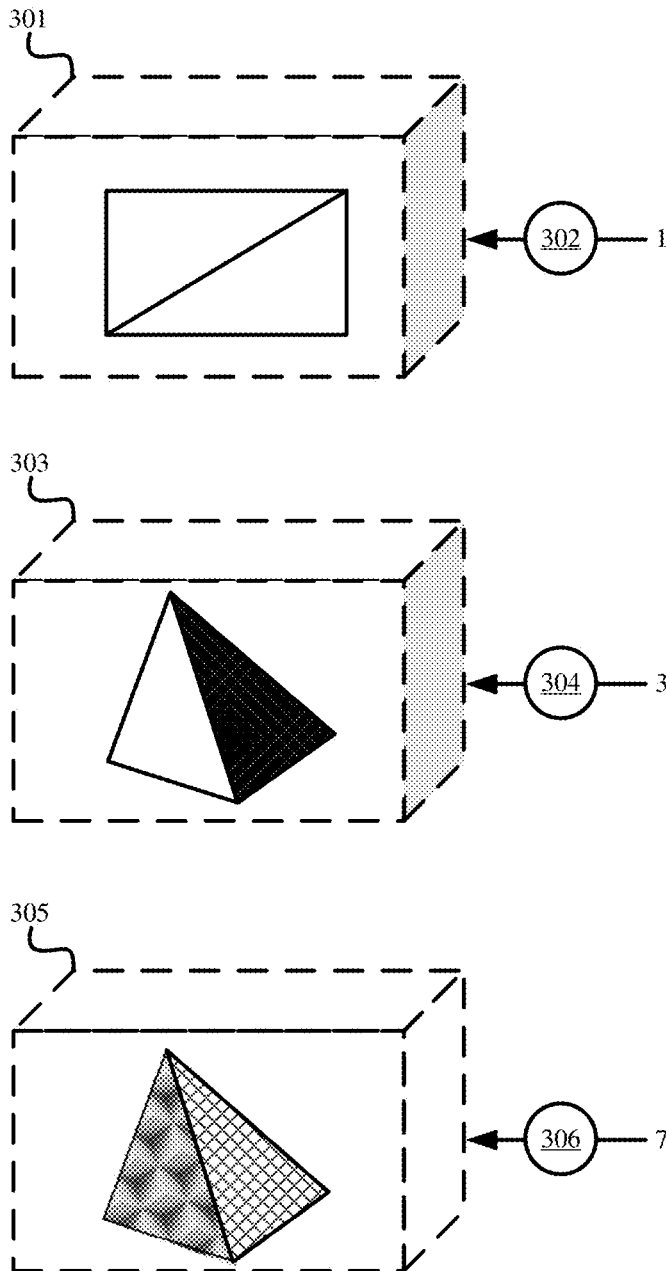
FIG. 3 illustrates an example of partitioned cells containing differing amounts of visual detail in accordance with some embodiments presented herein.

FIG. 3 illustrates an example of partitioned cells containing differing amounts of visual detail in accordance with some embodiments presented herein. FIG. 3 includes first cell 301 with the lowest amount of visual detail, second cell 303 with greater visual detail than the visual detail in first cell 301, and third cell 305 with the highest amount of visual detail.

First cell 301 includes two primitives that form a single flat surface with no color variation. Splat generation system 200 classifies first cell 301 as having the lowest amount of visual detail based on the lack of positional and color variation and may assign (at 302) a first score or value to indicate the detected or determined low amount of visual detail. Splat generation system 200 may determine the amount of visual detail without rendering the primitives in first cell 301. Splat generation system 200 may compare the color attributes of the two primitives to determine that there is little or no color or visual variation and may compare the positional attributes of the primitives to determine that there is little or no positional variation (e.g., the primitives are positioned about the same plane and form a flat surface). Additionally, splat generation system 200 may inspect textures defined for the 3D asset to determine that no texture data maps to the positions associated with the primitives in first cell 301. Accordingly, first cell 301 may be captured or imaged from a single perspective and from a far distance without losing any of the visual detail of the primitives in first cell 301. For instance, there is no loss if the distant imaging of the two primitives loses the distinction or differentiation of the primitives and blends the primitives into a single primitive with a uniform color.

Second cell 303 also includes two primitives. However, the two primitives in second cell 303 have positional and visual variation in a first amount. For instance, the two primitives are offset from one another so as to form a hard edge or a non-flat surface. Moreover, the two primitives are defined with different colors. Based on the positional and visual variation, splat generation system 200 may assign (at 304) a second score or value to second cell 303 to quantify the detected or determined first amount of visual detail. The second score or value may increase if there were additional primitives in second cell 303 (e.g., three or more primitives) that had positional and/or color variation from the other primitives in second cell 303. Splat generation system 200 may define two virtual cameras to ensure proper capture of the visual detail of the primitives in second cell 303 as a single virtual camera may be unable to capture the positional and visual variation from a single perspective.

Third cell 305 includes two primitives that have greater positional variation and greater visual variation than the primitives of second cell 303 due to one or more textures being defined for and/or applied to the two primitives in third cell 305. The textures may include a bump map that increases the positional or surface variation across one of two primitives and/or a texture map that changes the visual variation across the other primitive. The textures add significantly more detail to the primitives than the positional offsets and different colors of the primitives in second cell 303. Accordingly, Splat generation system 200 may assign (at 306) a third value to third cell 305 to quantify the amount of visual detail detected within third cell 305. Splat generation system 200 may define three virtual cameras to capture the visual variation and/or detail in third cell 305. The three virtual cameras capture the two primitives in third cell 305 from three different perspectives and/or positions to provide greater and/or enhanced coverage of the detail.

FIG. 4 presents a process 400 for automatically positioning virtual cameras to selectively capture a 3D asset for complete and enhanced coverage of the 3D asset in accordance with some embodiments presented herein. Process 400 is implemented by splat generation system 200.

Splat generation system 200 includes one or more devices or machines with processor, memory, storage, network, rendering, and/or other hardware resources for the generation of splat representations from other 3D formats. In some embodiments, splat generation system 200 may be part of a streaming platform that streams the splat representations over a data network to facilitate a real-time or on-demand viewing of the 3D assets from which the splat representations were generated. In some other embodiments, splat generation system 200 is part of a spatial computing, gaming, or other 3D platform that generates splat representations of 3D models for viewing on local or remote devices.

Process 400 includes receiving (at 402) a 3D asset for conversion to a splat representation. The 3D asset may be encoded in a non-splat format. For instance, the 3D asset may be encoded as a mesh model or a point cloud that is too large to stream in an acceptable amount of time over a data network or to create a real-time experience on the recipient device. A mesh encoding of the 3D asset may be defined with primitives that form a connected set of meshes. A point cloud encoding of the 3D asset may be defined with primitives that correspond to a disconnected set of points that are distributed about a 3D space. Alternatively, the 3D asset may be encoded as a high resolution or high fidelity 3D Gaussian splat representation that is too large to efficiently stream or too large for a real-time streaming experience. Accordingly, the 3D asset may be converted to a lower resolution or lower fidelity 3D Gaussian splat representation that may be streamed to a client device over a data network in an acceptable amount of time for the real-time experience. In some embodiments, splat generation system 200 receives a request for converting the 3D asset to the splat representation, and the request may include a copy of or link to the original encoding of the 3D asset. The 3D asset may be stored in local storage of splat generation system 200 or may be retrieved remotely from another device over a data network.

Process 400 includes partitioning (at 404) the 3D space in which the 3D asset is defined into equally sized volumetric cells. The partitioning (at 404) may include defining the cells as non-overlapping volumes or coordinates in the 3D space. The cells may correspond to voxels that are created from voxelizing the 3D space. The size of the cells may vary depending on the number of virtual cameras that are available to image the 3D asset and/or the amount of detail that is to be captured.

Process 400 includes identifying (at 406) a set of cells from the partitioned (at 404) 3D space that each encompass a part of one or more primitives. In other words, splat generation system 200 identifies (at 406) each cell that spans a volume of the 3D space that has one or more of the 3D asset primitives partially or wholly positioned in that volume. Splat generation system 200 may identify (at 406) the cells that contain or span one or more of the 3D asset primitives by comparing the positional data of the primitives to the coordinates or the 3D space volume spanned by each cell. Alternatively, splat generation system 200 may identify (at 406) the cells by rendering the 3D asset, placing the grid-like structure over the rendered 3D asset, and visually identifying the cells of the grid-like structure that encompass any rendered part of the 3D asset.

Process 400 includes determining (at 408) an amount of visual detail in each cell of the identified (at 406) set of cells. Splat generation system 200 determines (at 408) the amount of visual detail based on the number of primitives positioned in the cell's volume, the positional and/or visual variation between the primitives in the cell, and additional variation that may be added via textures that are defined and/or applied to the primitives in the cell. The amount of visual detail for each cell may be quantified or scored and associated with that cell or the primitives in the cell.

Process 400 includes defining (at 410) a number of virtual cameras to capture the primitives in each of the identified (at 406) set of cells according to the determined (at 408) amount of visual detail in each cell. In some embodiments, defining (at 410) the number of virtual cameras includes determining a number of different perspectives to image the primitives in each set of the identified (at 406) set of cells according to the determined (at 408) amount of visual detail in each cell, and determining the number of virtual cameras based on the number of different perspectives for capturing the primitives in each cell. Splat generation system 200 may change the number of virtual cameras that are defined (at 410) for the different determined (at 408) amounts of visual detail based on a total number of virtual cameras that splat generation system 200 is allowed to define (at 410). In any case, splat generation system 200 defines (at 410) a greater number of virtual cameras to capture the cells with the higher amounts of visual detail from more perspectives than other cells with lower amounts of visual detail.

Process 400 includes positioning (at 412) the defined (at 410) virtual cameras for complete coverage of the entire 3D asset and enhanced coverage of the primitives in cells with the higher determined (at 408) amounts of visual detail. Positioning (at 412) the virtual cameras may include orienting the virtual cameras to capture the primitives from the desired number of perspectives. Positioning (at 412) the virtual cameras may include adjusting the distance of the virtual cameras relative to the primitives that are to be captured or imaged by that virtual camera, wherein increasing the distance causes more primitives to fall into the virtual camera field-of-view albeit with fewer pixels capturing each of the primitives (e.g., the virtual camera capturing less detail of the primitives), and wherein decreasing the distance causes fewer primitives to fall into the virtual camera field-of-view so that more pixels are used to capture more detail from each individual primitive.

Splat generation system 200 captures an image of the 3D asset from each positioned (at 412) camera and feeds the images to a splatting engine. The splatting engine generates different sets of splats to reconstruct the detail in the images, compares the different sets of splats using a loss function, and defines the splat representation from the set of splats that reconstruct the detail in the images with the least amount of loss or with a threshold amount of loss.

Process 400 may be adapted for animated or dynamic 3D assets that are not static and that change over time. For instance, process 400 may be performed for each frame, key frame, or at specific frames of the animated or dynamic 3D asset. Splat generation system 200 may analyze the motion or rate of change occurring within the 3D asset and may perform process 400 for each frame of a 3D animation in order to redefine the virtual camera placement in each frame in response to the 3D asset experiencing significant change in shape, form, and/or visual characteristics in each frame or may perform process 400 at key frames or at specific frames where the shape, form, and/or visual characteristics of the animated 3D asset change significantly and new virtual camera placement is needed to ensure complete and enhanced coverage of the 3D asset as it changes shape or form. For instance, the 3D asset may be animated humanoid character. When the character's face rotates by some distance, spalt generation system 200 may perform process 400 to redefine the virtual camera positions so that the face receives greater coverage and/or is imaged at a consistent level-of-detail at different positions.

Figure 5:
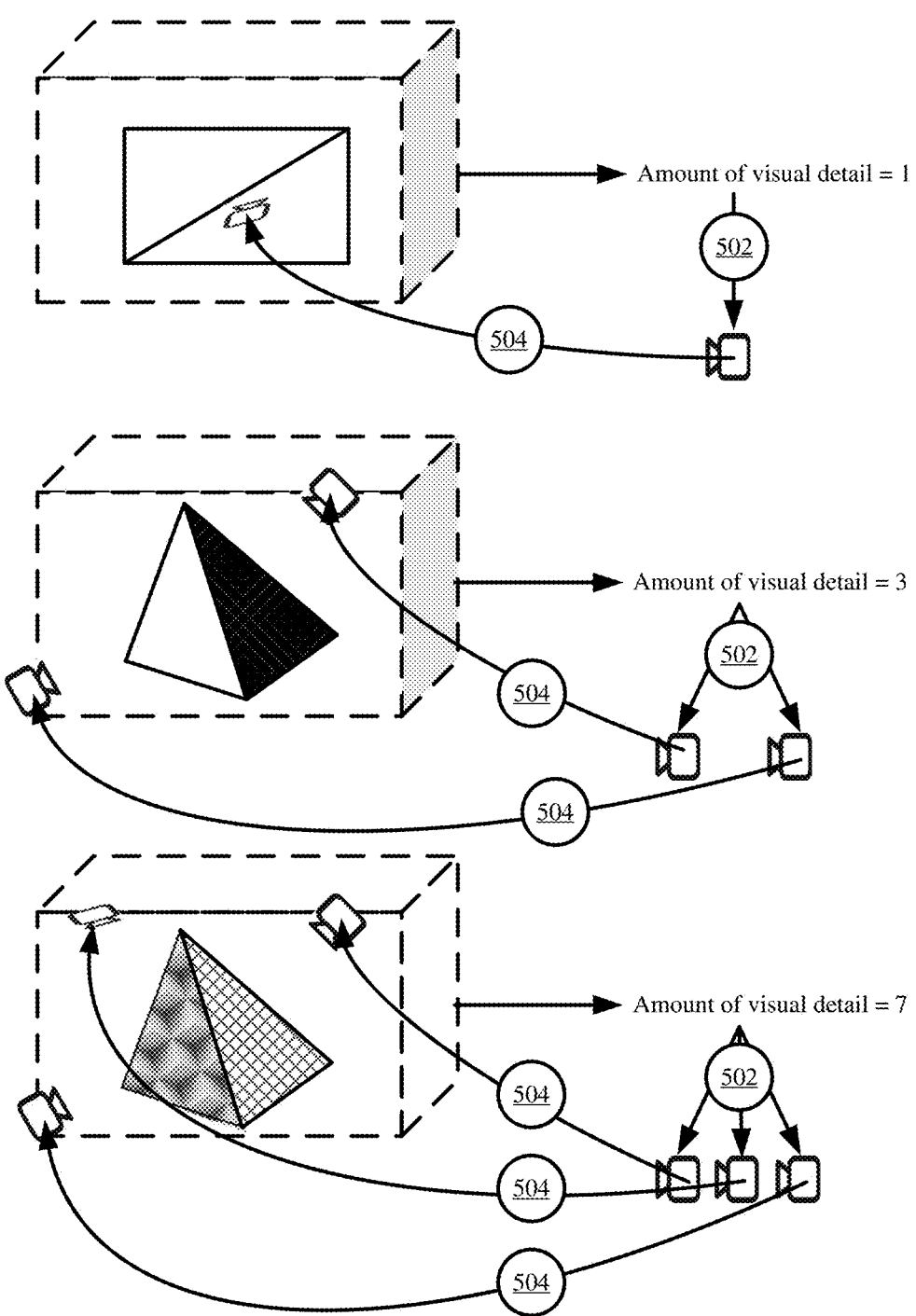
FIG. 5 illustrates a virtual camera placement for the complete and enhanced coverage of primitives in accordance with some embodiments presented herein.

FIG. 5 illustrates a virtual camera placement for the complete and enhanced coverage of primitives in accordance with some embodiments presented herein. Splat generation system 200 may define (at 502) a number of virtual cameras to capture the primitives within each cell or voxel based on the amount of visual detail in that cell or voxel. Splat generation system 200 then moves or positions (at 504) the virtual cameras on or away from the cell or voxel so that the virtual cameras are equidistant from the primitives in that virtual camera's field-of-view. The equidistant virtual camera placement ensures that all primitives are captured at the same resolution with the primitives that are associated with greater detail being captured at the same resolution from multiple different perspectives.

In some embodiments, splat generation system 200 positions (at 504) the virtual cameras to maximize the number of primitives that fall in the field-of-view of each virtual camera. In some embodiments, splat generation system 200 positions (at 504) the virtual cameras to ensure that each primitive is around the field-of-view center of at least one virtual camera. For primitives that are to be captured from multiple perspectives, splat generation system 200 may position (at 504) the virtual cameras to have a minimal offset (e.g., more than 30-degrees) from one another or to maximize the angle, orientation, and/or positional offset between the different virtual cameras that capture the same primitive or primitives.

In some embodiments, splat generation system 200 uses the outlines of the cells or voxels for the positional rigging of the virtual cameras. In some such embodiments, splat generation system 200 moves or repositions the virtual cameras to different positions about the cell or voxel when the volume of the cell or voxel is large enough to capture the encompassed primitives at a desired resolution or set of resolutions. In some other embodiments, splat generation system 200 uses the outlines of multiple neighboring cells or voxels for the positional rigging of the virtual cameras or positions the virtual cameras to capture the primitives in the multiple neighboring cells or voxels. For instance, capturing the primitives in each cell or voxel with a different virtual cameras may require hundreds or thousands of virtual cameras with each virtual camera capturing the primitives too closely such that the number of pixels are excessive for the maximum amount of detail on any given primitive. Accordingly, splat generation system 200 may position a virtual camera to capture the primitives in two or more neighboring cells or voxels and may select the neighboring cells or voxels that are to be in the field-of-view of a single virtual camera to include cells or voxels with primitives having surface normals directed in a common direction or with primitives facing a common orientation to ensure that none of the primitives are obscured from the virtual camera field-of-view or are offset too much that the virtual camera is unable to capture all of the details associated with those primitives.

In some embodiments, splat generation system 200 may position the virtual cameras about different shaped camera rigs. In some such embodiments, splat generation system 200 selects the different shaped camera rigs to match different shapes that are detected across the 3D asset, and places the virtual cameras about the different shaped camera rigs for a consistent and/or complete imaging of the 3D asset primitives.

Figure 6:
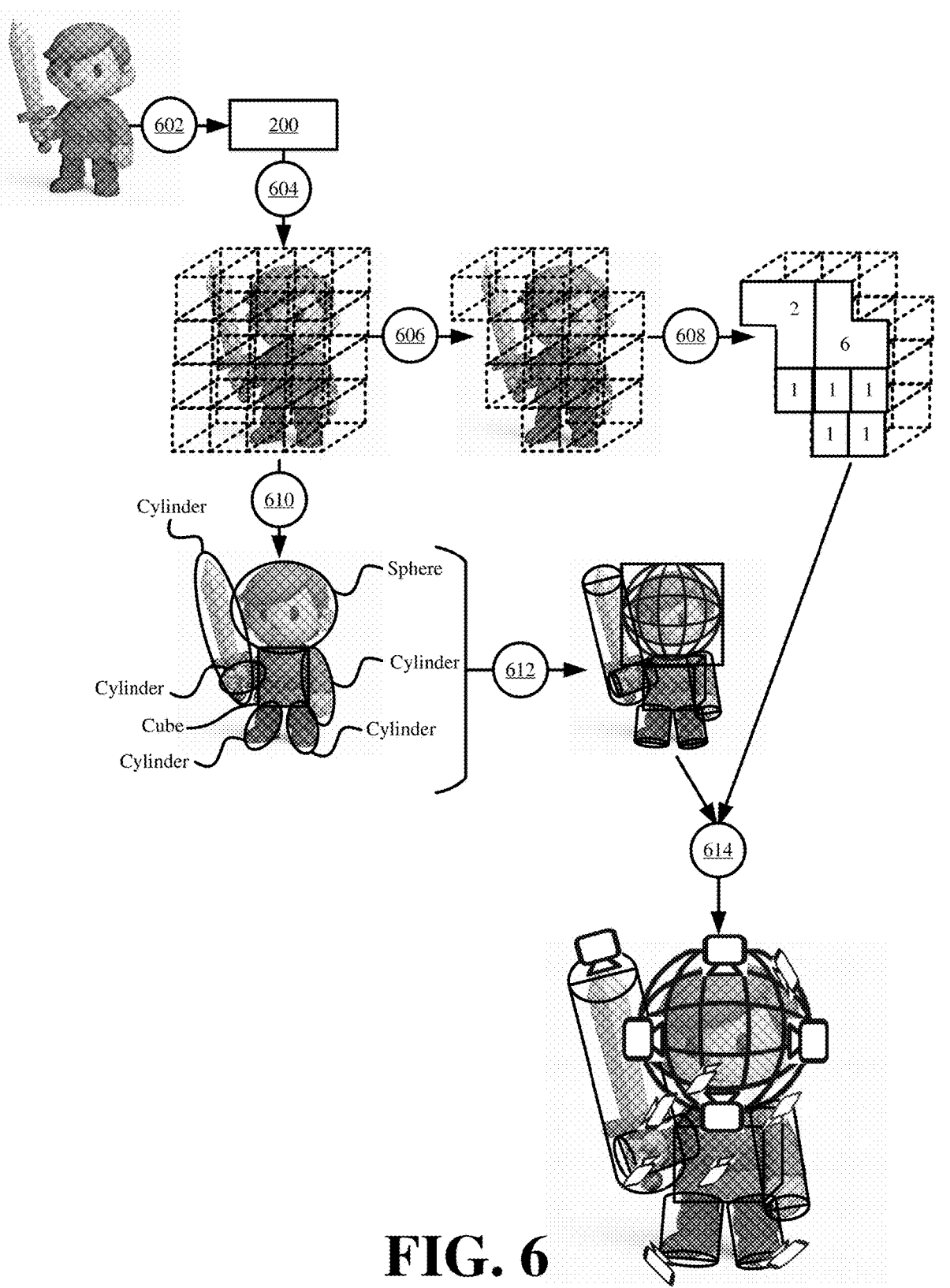
FIG. 6 illustrates an example of dynamically positioning virtual cameras for the selective capture of a 3D asset about different shape conforming camera rigs in accordance with some embodiments presented herein.

FIG. 6 illustrates an example of dynamically positioning virtual cameras for the selective capture of a 3D asset about different shape conforming camera rigs in accordance with some embodiments presented herein. Splat generation system 200 receives (at 602) a 3D asset of a humanoid character. Splat generation system 200 voxelizes (at 604) the 3D asset, selects (at 606) the cells or voxels with one or more of the 3D asset primitives, and determines (at 608) a number of virtual cameras for capturing the one or more 3D asset primitives in each cell or voxel based on the detected amount of visual detail within each cell or voxel.

To position the virtual cameras, splat generation system 200 classifies (at 610) the different shapes that form the 3D asset. Splat generation system 200 may be configured with various predefined 3D shapes and performs a best fit or matching routine to identify different subsets of the 3D asset primitives that collectively form a shape that is similar to one of the various predefined 3D shapes. In some embodiments, splat generation system 200 renders the 3D asset and performs a shape matching image analysis or shape deconstruction of the rendered visualization to identify the different predefined 3D shapes within the 3D asset. For instance, splat generation system 200 may identify the humanoid character's head as spherical in shape, the body as having a cubic shape, and the limbs as having cylindrical shapes.

Splat generation system 200 positions (at 612) camera rigs having the classified shapes over the corresponding regions or sets of primitives from the 3D asset. For instance, a sphere that completely surrounds the humanoid character head is placed over and around the primitives forming the head. Similarly, cylinders are positioned over and around the primitives forming the humanoid character limbs.

Splat generation system 200 positions (at 614) the virtual cameras across the camera rigs to fully capture the 3D asset primitives and provide enhanced coverage or capture of the prioritized primitives or the set of primitives with greater visual detail. Positioning (at 614) the virtual cameras includes placing the virtual cameras about the camera rig surface and orienting the virtual cameras to capture the primitives from the desired number of perspectives. The number of virtual cameras determined (at 608) for certain cells or regions of the 3D asset may be positioned about the camera rigs covering the same volumes as the cells or regions of the 3D asset.

The different shaped camera rigs match the different dimensionality and forms of the 3D asset, thereby simplifying the virtual camera placement for the differentiated capture of the 3D asset primitives. In other words, splat generation system 200 may avoid having to compute a common distance between each virtual camera and one or more primitives in deciding where to place the virtual camera, and may instead select a position about the different shaped camera rigs to ensure complete and enhanced coverage of the 3D asset.

In some embodiments, splat generation system 200 places the virtual cameras to have different distances from the 3D asset primitives so that the primitives may be captured with different amounts of visual detail and/or at different resolutions. In some such embodiments, splat generation system 200 places a virtual camera farther away from a first set of primitives with little or low visual detail so that the virtual camera may capture all primitives of the first set of primitives in one image at a low first resolution as fewer pixels of the image are used to capture the visual detail of each primitive in the first set of primitives. Conversely, splat generation system 200 may place two virtual cameras closer to a second set of primitives with lots of visual detail so that each of the two virtual cameras captures a different subset of the second set of primitives (e.g., fewer primitives in an image than the image capturing all of the first set of primitives) at a higher second resolution in which more pixels of each image are used to capture the visual detail of each primitive in the second set of primitives.

Figure 7:
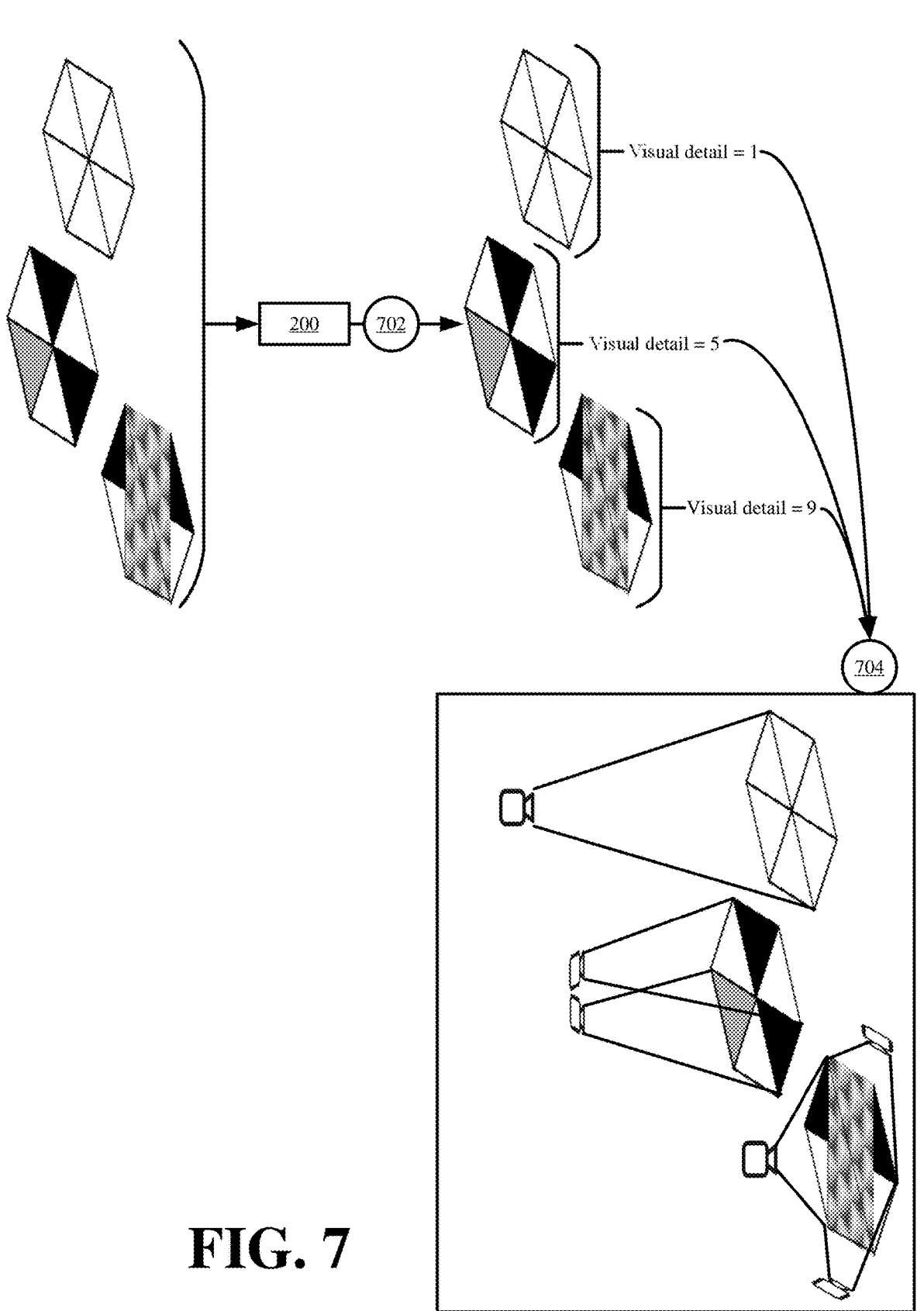
FIG. 7 illustrates an example of the different virtual camera placement for the dynamic differentiated capture of a 3D asset in accordance with some embodiments presented herein.

FIG. 7 illustrates an example of the different virtual camera placement for the dynamic differentiated capture of a 3D asset in accordance with some embodiments presented herein. Splat generation system 200 determines (at 702) the different amounts of visual detail contained by the different cells or voxels in the partitioned 3D space of the 3D asset.

Splat generation system 200 defines and places (at 704) the virtual cameras so that a particular sized first region of the 3D space associated with a low first amount of visual detail is captured from a far first distance with a single virtual camera, a second region of the 3D space with the same particular size as the first region and with a medium second amount of visual detail is captured from a closer second distance with two virtual cameras, and third region of the 3D space with the same particular size as the first region with a highest third amount of visual detail is captured from a closest third distance with three virtual cameras. The primitives of the first region are captured at a lowest first resolution and with the least detail due the distant placement of the single virtual camera resulting in each primitive in the first region being captured with the fewest number of pixels. The primitives of the second region are captured at a medium second resolution and with more detail than the first region primitives due the closer placement of the two virtual camera resulting in each primitive in the second region being captured with more pixels than each first region primitive. The primitives of the third region are captured at a highest third resolution and with the most detail due the closest placement of the virtual camera resulting in each primitive in the third region being captured with more pixels than the second region primitives. The closer up capture of the third region results in more of the visual details being preserved in the images while the farther away capture of the first region is sufficient to preserve the lesser detail of the primitives in that region without quality loss.

In some embodiments, the number of virtual cameras and/or the positioning of the virtual cameras may be specified by a user. The user may adjust the number of virtual cameras and/or their positioning to obtain higher resolution or lower resolution images of the 3D asset primitives. The images are used as the reference data from which a splat representation of the 3D asset is produced. Accordingly, if the reference images are higher resolution and capture more visual detail, then the resulting splat representation will be higher resolution and reconstruct more of the detail from the original 3D asset. Similarly, if the reference images are lower resolution and capture less visual detail, then the resulting splat representation will be lower resolution and reconstruct less of the detail from the original 3D asset. By controlling the number of virtual cameras and/or their positioning, a user may control the amount of loss and/or size of the resulting splat representation, and thereby optimize the splat representation for streaming across data network with different bandwidth and/or performance.

Figure 8:
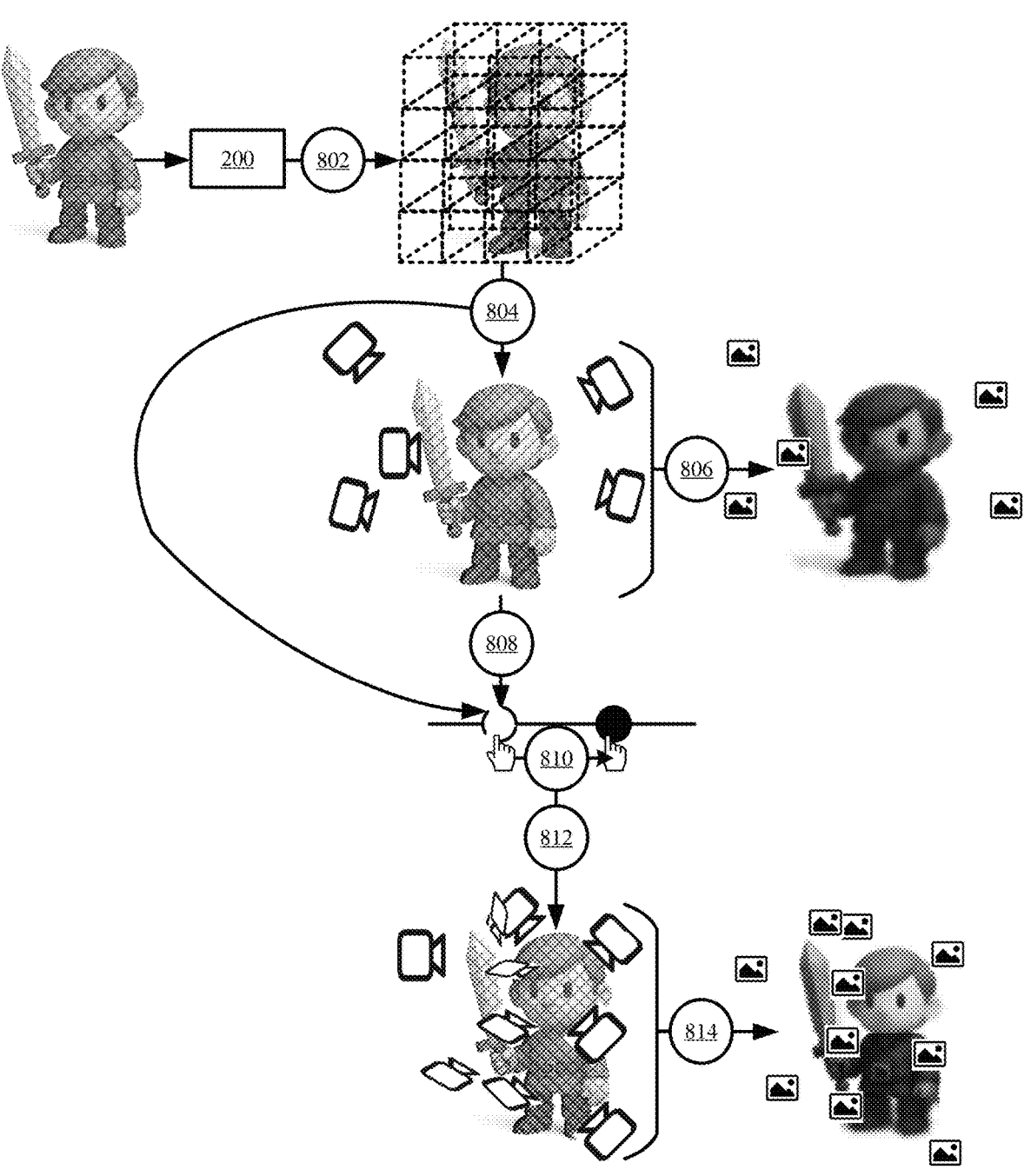
FIG. 8 illustrates an example of modifying the number of selectively placed virtual cameras for generating different quality splat representations of a 3D asset in accordance with some embodiments.

FIG. 8 illustrates an example of modifying the number of selectively placed virtual cameras for generating different quality splat representations of a 3D asset in accordance with some embodiments. Splat generation system 200 partitions (at 802) the 3D space of the 3D asset into cells or voxels, and defines and places (at 804) a first number of virtual cameras to non-uniformly capture the 3D asset. The placement (at 804) of the first number of virtual cameras includes placing more virtual cameras to capture primitives with greater visual detail from additional perspectives and/or closer distances and placing fewer cameras to capture primitives with less visual detail from fewer perspectives and/or farther distances.

The first number of virtual cameras capture the 3D asset with a first amount of non-uniform detail. A splatting engine of splat generation system 200 generates (at 806) different sets of splats to reconstruct the first amount of non-uniform detail in the images captured by the first number of virtual cameras with a threshold amount of loss. Accordingly, the generated splat representation cannot have more detail than the detail that is captured by the first number of virtual cameras.

Splat generation system 200 provides (at 808) a slider or other user interface control to adjust the first number of virtual cameras. Reducing the virtual camera count causes the 3D asset to be captured with a second amount of non-uniform detail that is less than the first amount of non-uniform detail and results in the generated splat representation reconstructing that lesser amount of non-uniform detail. Consequently, reducing the virtual camera count results in the splat representation having fewer total splats, less total data, and a lower fidelity representation of the 3D asset. Conversely, increasing the virtual camera count causes the 3D asset to be captured with a third amount of non-uniform detail that is greater than the first amount of non-uniform detail and results in the generated splat representation reconstructing that greater amount of non-uniform detail.

The user adjusts the slider to increase (at 810) the total number of virtual cameras used to capture the 3D asset visual detail. For instance, the splat representation that is generated from the first number of virtual cameras may have a first size that is less than the available bandwidth for real-time streaming of 3D content, and the user may increase the number of virtual cameras so that the resulting splat representation preserves more of the visual detail of the original 3D asset and has a second size that is equal to the available bandwidth for real-time streaming of 3D content.

Splat generation system 200 redefines and repositions (at 812) a second number of virtual cameras to image the 3D asset based on the user adjustment to the user interface virtual camera control. In some embodiments, splat generation system 200 may reposition and reorient all the defined virtual cameras anew rather than position the newly added virtual cameras amongst the previously defined virtual cameras. In some such embodiments, splat generation system 200 may redistribute the virtual cameras so that all primitives are captured at a higher base resolution or fidelity and the primitives associated with greater visual detail are also captured at higher resolutions from the same number of additional perspectives or increased perspectives. For instance, the additional virtual cameras may allow splat generation system 200 to position the virtual cameras closer to the 3D asset primitives so that more of the primitive detail is captured in the images. Moreover, the additional virtual cameras may allow splat generation system 200 to change the number of perspectives with which primitives associated with different amounts of visual detail are captured.

The splatting engine of splat generation system 200 generates (at 814) different sets of splats to reconstruct the second amount of non-uniform detail in the images captured by the increased second number of virtual cameras with a threshold amount of loss. The resulting splat representation has more detail than the splat representation that was generated to reconstruct the first amount of non-uniform detail. The resulting splat representation may have a larger size that is still within the available bandwidth for the real-time streaming of 3D content to a user device over a data network.

Figure 9:
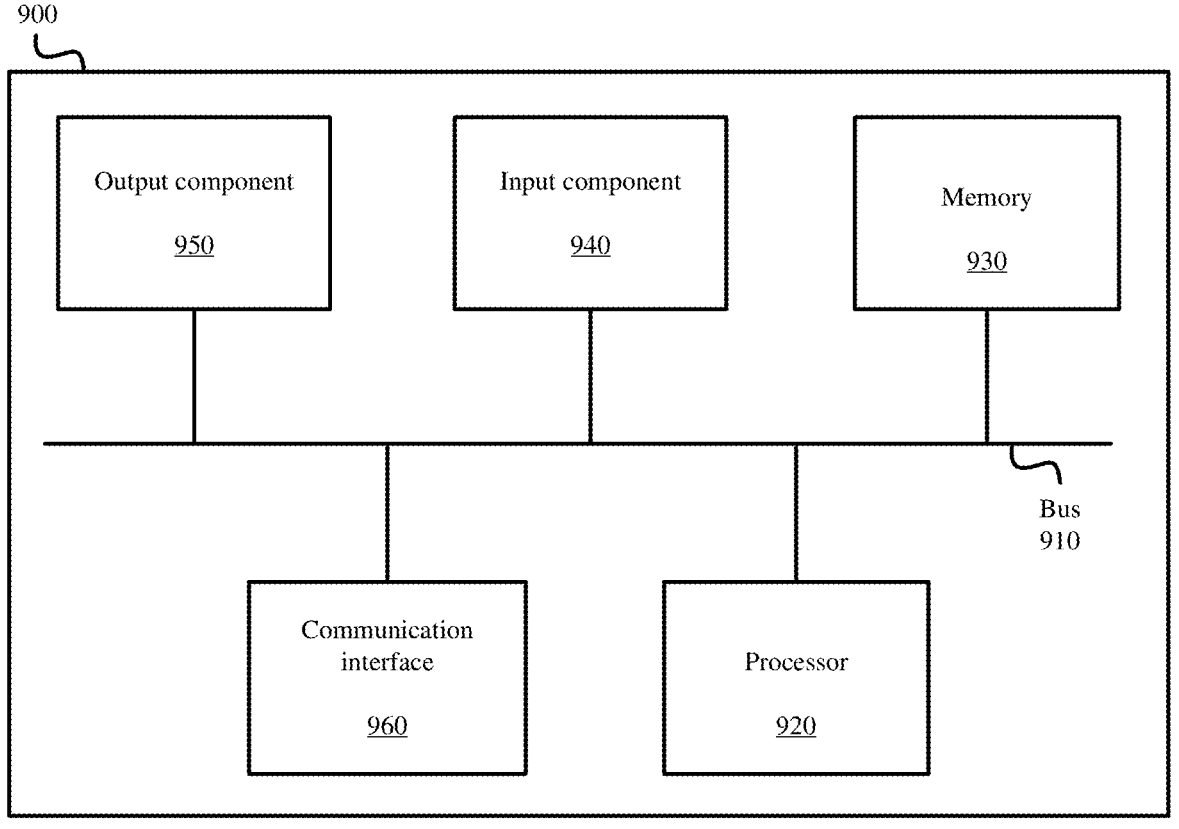
FIG. 9 illustrates example components of one or more devices, according to one or more embodiments described herein.

FIG. 9 is a diagram of example components of device 900. Device 900 may be used to implement one or more of the tools, devices, or systems described above (e.g., splat generation system 200). Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more LEDs, etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

The invention claimed is:

1. A method comprising:

receiving a three-dimensional (3D) asset comprising a plurality of primitives that are each defined with a position and visual characteristics in a 3D space;

partitioning the 3D space into a plurality of cells;

selecting a set of cells from the plurality of cells encompassing a volume of the 3D space in which one or more primitives of the plurality of primitives are defined;

calculating a value for each individual cell of the set of cells based on a number of primitives and positional or color differences between the one or more primitives in the individual cell;

positioning a plurality of virtual cameras in the 3D space to capture a first set of primitives from the plurality of primitives in a first cell of the set of cells from a first number of positions and angles based on the value calculated for the first cell and to capture a second set of primitives from the plurality of primitives in a second cell of the set of cells from a second number of positions and angles that is less than the first number of positions and angles based on the value calculated for the second cell being less than the value calculated for the first cell;

generating a plurality of images that non-uniformly capture the 3D asset based on said positioning of the plurality of virtual cameras; and iteratively generating a non-uniform splat representation that reconstructs the 3D asset based on the non-uniform capture of the 3D asset in the plurality of images.

2. The method of claim 1, wherein iteratively generating the non-uniform splat representation comprises:

generating a first plurality of splats in the volume of the 3D space encompassed by the first cell and a second plurality of splats in the volume of the 3D space encompassed by the second cell, wherein the first plurality of splats have a smaller size than the second plurality of splats.

3. The method of claim 2 further comprising:

streaming the non-uniform splat representation to a requesting device in response to a request for the 3D asset from the requesting device.

4. The method of claim 2, wherein the non-uniform splat representation is defined in a different 3D format than the 3D asset, and wherein the non-uniform splat representation has a smaller size than the 3D asset.

5. The method of claim 1, wherein calculating the value comprises:

adjusting the value for a particular cell based on a number of textures that are applied to the one or more primitives in the particular cell.

6. The method of claim 1 further comprising:

defining a total number of virtual cameras for non-uniformly capturing the 3D asset based on the value that is calculated for each cell of the set of cells.

7. The method of claim 1, wherein positioning the plurality of virtual cameras comprises:

placing each particular virtual camera from the plurality of virtual cameras an equal distance from one or more of the plurality of primitives in a field-of-view of that particular virtual camera.

8. The method of claim 1, wherein positioning the plurality of virtual cameras comprises:

placing a first set of the plurality of virtual cameras a first distance to the first set of primitives and a second set of the plurality of virtual cameras a second distance to the second set of primitives, wherein the first distance is less than the second distance.

9. The method of claim 1 further comprising:

determining that the first set of primitives form a first shape and that the second set of primitives form a second shape;

placing a first camera rig of the first shape around the first set of primitives and a second camera rig of the second shape around the second set of primitives; and wherein positioning the plurality of virtual cameras comprises:

positioning a first set of the plurality of virtual cameras about the first camera rig; and positioning a second set of the plurality of virtual cameras about the second camera rig.

10. The method of claim 1, wherein the first set of primitives comprises primitives that are modified by one or more textures, wherein the second set of primitives comprises primitives that are not modified by one or more textures, and wherein the one or more textures increase the value calculated for the first cell.

11. The method of claim 1, wherein the first set of primitives comprises neighboring primitives with a positional or visual variation that is greater than a positional or visual variation between neighboring primitives of the second set of primitives.

12. The method of claim 1 further comprising:

providing a user interface control for adjusting a number of virtual cameras used to generate the plurality of images.

13. The method of claim 12 further comprising:

increasing the plurality of virtual cameras from a first number of virtual cameras to a larger second number of virtual cameras in response to a user adjustment of the user interface control;

positioning the larger second number of virtual cameras at positions relative to the plurality of primitives that are different than a positioning of the first number of virtual cameras; and generating a second plurality of images from positions of the larger second number of virtual cameras, wherein the second plurality of images capture more visual detail of the 3D asset than the plurality of images that are generated from the positioning of the first number of virtual cameras.

14. A splat generation system comprising:

one or more hardware processors configured to:

receive a three-dimensional (3D) asset comprising a plurality of primitives that are each defined with a position and visual characteristics in a 3D space;

partition the 3D space into a plurality of cells;

select a set of cells from the plurality of cells encompassing a volume of the 3D space in which one or more primitives of the plurality of primitives are defined;

calculate a value for each individual cell of the set of cells based on a number of primitives and positional or color differences between the one or more primitives in the individual cell;

position a plurality of virtual cameras in the 3D space to capture a first set of primitives from the plurality of primitives in a first cell of the set of cells from a first number of positions and angles based on the value calculated for the first cell and to capture a second set of primitives from the plurality of primitives in a second cell of the set of cells from a second number of positions and angles that is less than the first number of positions and angles based on the value calculated for the second cell being less than the value calculated for the first cell;

generate a plurality of images that non-uniformly capture the 3D asset based on said positioning of the plurality of virtual cameras; and iteratively generate a non-uniform splat representation that reconstructs the 3D asset based on the non-uniform capture of the 3D asset in the plurality of images.

15. The splat generation system of claim 14, wherein iteratively generating the non-uniform splat representation comprises:

generate a first plurality of splats in the volume of the 3D space encompassed by the first cell and a second plurality of splats in the volume of the 3D space encompassed by the second cell, wherein the first plurality of splats have a smaller size than the second plurality of splats.

16. The splat generation system of claim 15, wherein the one or more hardware processors are further configured to:

stream the non-uniform splat representation to a requesting device in response to a request for the 3D asset from the requesting device.

17. The splat generation system of claim 15, wherein the non-uniform splat representation is defined in a different 3D format than the 3D asset, and wherein the non-uniform splat representation has a smaller size than the 3D asset.

18. The splat generation system of claim 14, wherein calculating the value comprises:

adjusting the value for a particular cell based on a number of textures that are applied to the one or more primitives in the particular cell.

19. The splat generation system of claim 14, wherein the one or more hardware processors are further configured to:

define a total number of virtual cameras for non-uniformly capturing the 3D asset based on the value that is calculated for each cell of the set of cells.

20. A non-transitory computer-readable medium storing instructions that, when executed by one or more processors of a splat generation system, cause the splat generation system to perform operations comprising:

receiving a three-dimensional (3D) asset comprising a plurality of primitives that are each defined with a position and visual characteristics in a 3D space;

partitioning the 3D space into a plurality of cells;

selecting a set of cells from the plurality of cells encompassing a volume of the 3D space in which one or more primitives of the plurality of primitives are defined;

calculating a value for each individual cell of the set of cells based on a number of primitives and positional or color differences between the one or more primitives in the individual cell;

positioning a plurality of virtual cameras in the 3D space to capture a first set of primitives from the plurality of primitives in a first cell of the set of cells from a first number of positions and angles based on the value calculated for the first cell and to capture a second set of primitives from the plurality of primitives in a second cell of the set of cells from a second number of positions and angles that is less than the first number of positions and angles based on the value calculated for the second cell being less than the value calculated for the first cell;

generating a plurality of images that non-uniformly capture the 3D asset based on said positioning of the plurality of virtual cameras; and iteratively generating a non-uniform splat representation that reconstructs the 3D asset based on the non-uniform capture of the 3D asset in the plurality of images.

\* \* \* \* \*